Patented Oct. 10, 1944

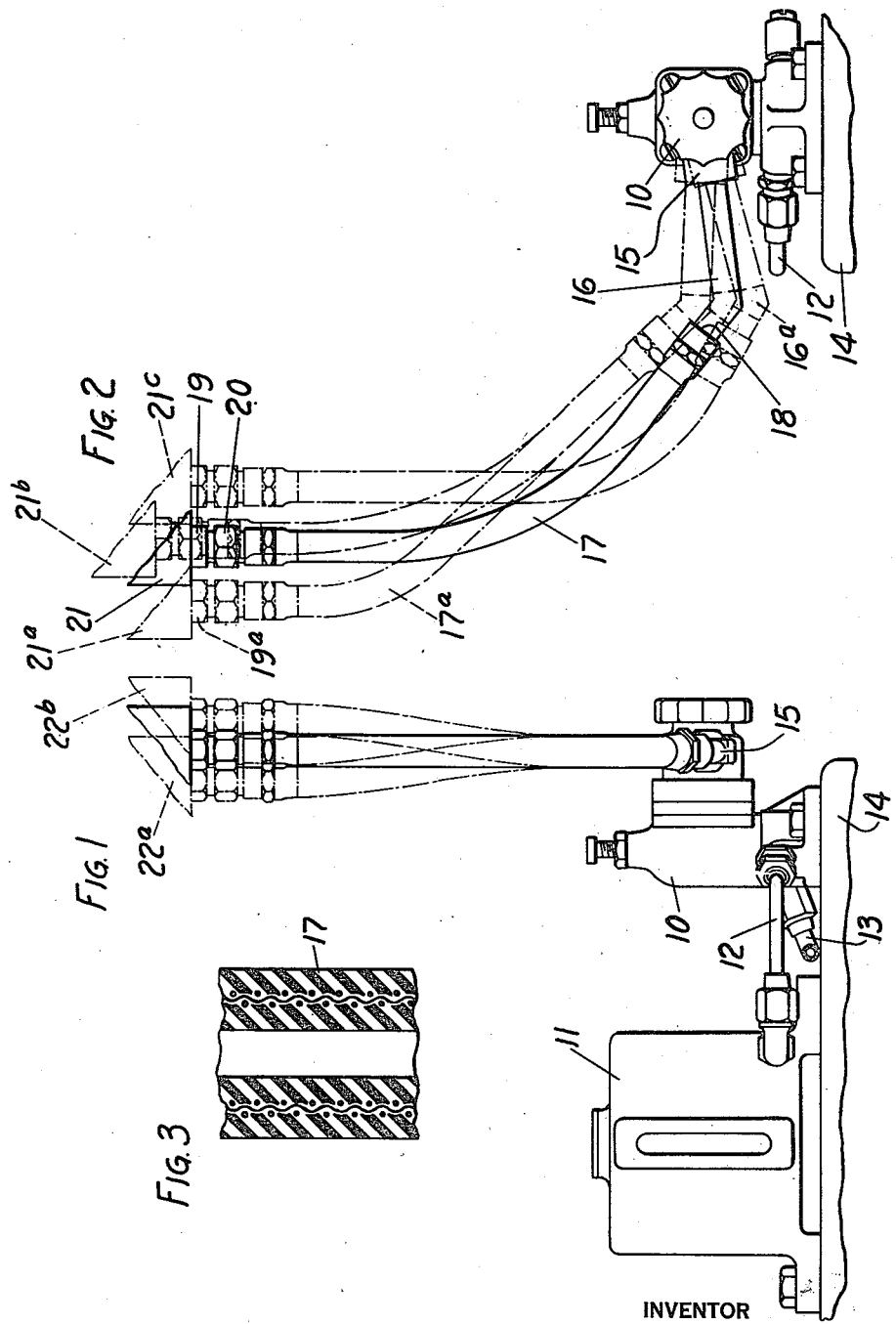

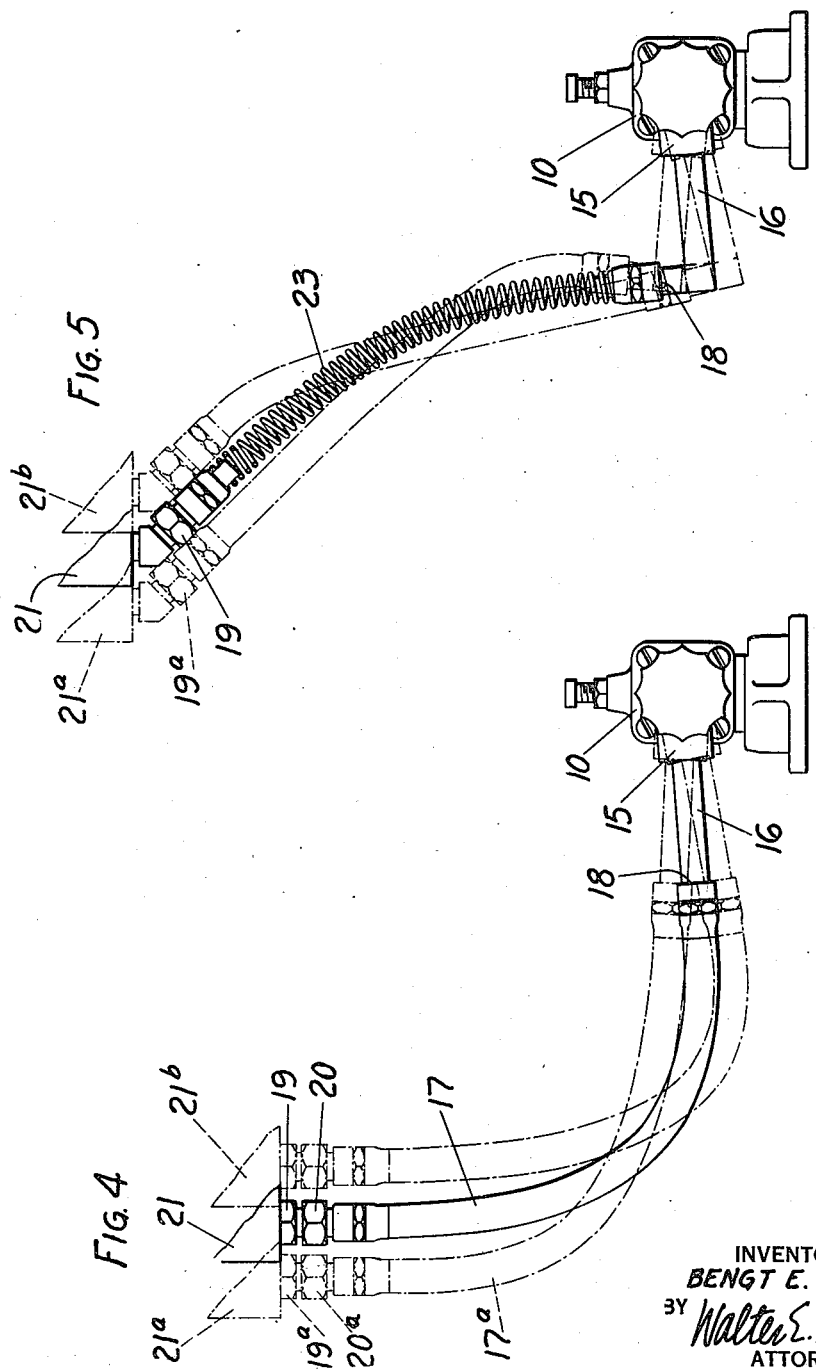

2,359,905

UNITED STATES PATENT OFFICE 2,359,905

ACTUATING MEANS FOR MECHANICAL LUBRICATORS

Bengt E. Folke, Mamaroneck, N. Y., assignor to Nathan Manufacturing Company, New York, N. Y., a corporation of New York Application April 9, 1943, Serial No. 482,363

2 Claims. (Cl. 184—14)

The purpose of this invention is to provide novel means to actuate mechanical force feed lubricators or similar devices provided with ratchet drive mechanisms.

Mechanical lubricators are usually actuated by means of a ratchet drive mechanism deriving its movement from some member having a controlled movement in one plane only, or by a suitable rotating movement. These movements may be derived from a part of the machine to be lubricated or may be obtained by the use of a separate motor-driven actuator. Such drive arrangements become frequently complicated and expensive. At other times a suitable controlled mechanical movement is difficult to obtain.

One object of the invention is to provide a simple dependable means for actuating a mechanical lubricator, utilizing the relative movements between that part on which the lubricator is mounted and adjacent parts having multidirectional movements in relation to the lubricator.

Another object is to provide means for transmitting non-harmonious movements to the lubricator ratchet drive mechanism without imparting severe strains on the lubricator mechanism.

A further object is to provide a mechanism devoid of universal joints and metallic connections difficult to maintain.

Another object is to provide a lubricator actuating means readily adjustable to changing alignments of the actuating member.

Still further objects will become apparent in the following specification and in the drawings in which preferred embodiments of the invention are, respectively, described and shown.

In the drawings:

Fig. 1 is a front elevational view of a mechanical lubricator and its oil reservoir located on the truck frame of a rail vehicle having the novel actuating means connected to the body structure of said vehicle;

Fig. 2 shows an end view of the lubricator and its actuating means with the oil reservoir omitted and with the actuating member in different relative positions to the lubricator;

Fig. 3 shows a fragmentary longitudinal sectional view illustrating a preferred construction of the actuating member;

Figs. 4 and 5 are end views similar to Fig. 2 embodying modified forms of the invention.

Like characters of reference denote similar parts throughout the several views and in the following specification.

Referring to Figs. 1 and 2, 10 is a mechanical lubricator provided with an oil reservoir 11, an oil inlet conduit 12 and one or more discharge conduits 13. The lubricator is shown located on a rail vehicle truck frame as outlined at 14. The lubricator is provided with a ratchet drive unit 15 of a construction well-known in the art and provided with a ratchet lever 16. A reinforced resilient or elastic member 17 has one end screwed into the lubricator ratchet lever at 18 and has its other end attached to a fitting 19 by means of a union connection 20. The fitting 19 is attached to the lower part of a vehicle body structure indicated at 21. The resilient member 17 is preferably of tubular construction such as, for example, a hose made from rubber, or similar material, and reinforced internally as shown in Fig. 3, or otherwise, in order to offer a degree of resistance to bending, that is, it has the characteristic of springing back to its normal or original position.

As will be noted from Fig. 2, the body structure 21 occupies different positions in relation to the lubricator 10, indicated, respectively, at 21a, 21b and 21c. It may also occupy positions as at 22a and 22b in Fig. 1. It will be noted that the relative movement of the structure 21, for example, to position indicated as 21a also brings the fitting 19 into the position indicated as 19a. This, in turn, brings the elastic member 17 into a position indicated as 17a and causes the lubricator ratchet lever 16 to move through an angle into the position 16a. The resilient member 17 is sufficiently rigid to return the ratchet lever to the original position as at 16 when the body structure returns to its normal relative position as at 21.

Since the member 17 has a degree of flexibility or elasticity, it will be seen that the fitting 19 would be free to move into positions 22a and 22b without imposing undue strain on the lubricator ratchet mechanism, such movements being frequently encountered between the truck and body structure of rail vehicles at time due to longitudinal flexibility between the members.

The movement of a vehicle body structure in relation to its wheel or truck structure is determined to a considerable extent by the roughness of the road-bed, causing the movements to be irregular, and if they were transmitted directly to the lubricator ratchet lever, severe stresses would be imparted to the lubricator. The flexible member 17, while sufficiently rigid to transmit regular movements to the lubricator ratchet, on the other hand is sufficiently resilient to prevent shocks from being transmitted.

It will be readily understood that the above actuating means may be used to transmit the movement from any structural member having a suitable movement in relation to the lubricator.

While the flexible mmeber 17 is shown attached to the lubricator ratchet drive lever 16 at an angle of approximately 45 degrees, as shown in Fig. 2, it is sometimes convenient to attach the flexible member as an extension of the ratchet lever. This method of actuating the lubricator is shown in Fig 4. In some cases better results are obtained by connecting the flexible member at right angles to the lubricator ratchet lever and this method is shown in Fig. 5. In Figs. 4 and 5 parts conforming to the structure shown in Figs. 1 and 2 are numbered correspondingly.

While I have disclosed the actuating member as of tubular construction, it is obvious that it could be modified by the use of a closely coiled spring having the desired stiffness and elasticity, as for instance indicated at 23 in Fig. 5.

What I claim as new, is:

1. The combination with a fixedly mounted lubricator of the mechanical type, a ratchet drive actuating said lubricator including an actuating arm, a support having multi-directional movement relative to said lubricator, and an operating member directly connecting said support and the actuating arm of said ratchet drive for the purpose of transmitting the movement of said support to said ratchet drive, said member having an elastic portion and being unconfined substantially throughout its length and having rigid terminals at both ends fixedly secured to said elastic portion, one of said terminals being fixedly secured to said support and the other terminal to said actuating arm.

2. The combination with a fixedly mounted lubricator of the mechanical type, a ratchet drive actuating said lubricator, a support having multi-directional movement relative to said lubricator, and an operating member directly connecting said support and said ratchet drive for the purpose of transmitting the movement of said support to the said ratchet drive, said member having a reinforced resilient portion and being unconfined substantially throughout its length and having rigid terminals at both ends fixedly secured to said elastic portion, one of said terminals being fixedly secured to said support and the other terminal to said actuating arm.

BENGT E. FOLKE.